Figure 1:
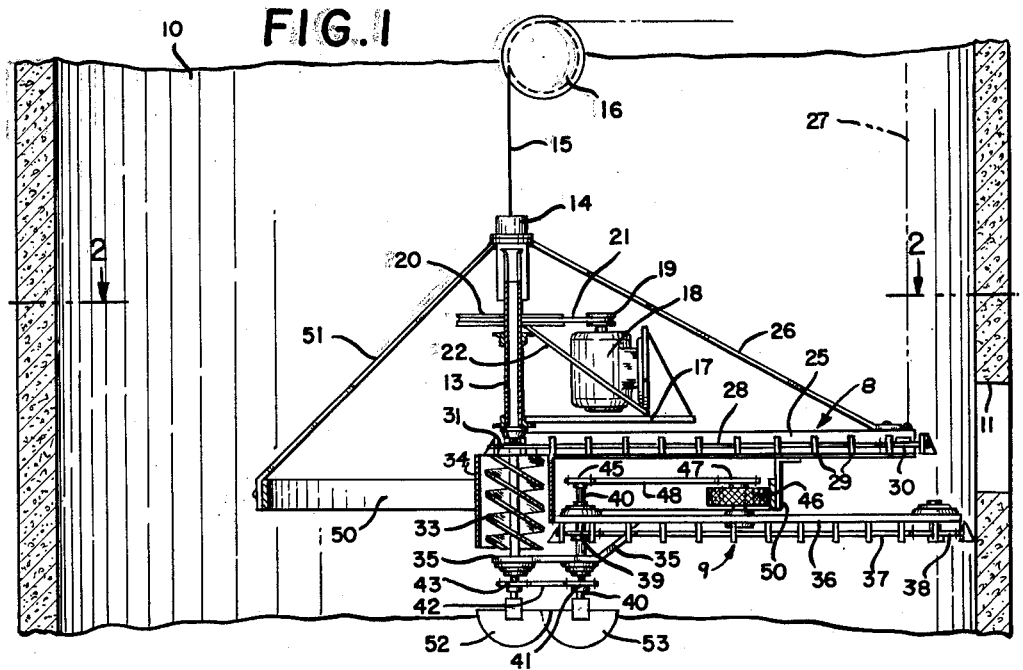

Sept. 1, 1964 G. B. BRUECKER 3,146,899
SILO UNLOADERS
Filed Dec. 19, 1963

INVENTOR.
GEO. B. BRUECKER
BY
Morsell & Morsell
ATTORNEYS

United States Patent Office 3,146,899
Patented Sept. 1, 1964

3,146,899
SILO UNLOADERS
George B. Bruecker, 1412 Oak Ridge, Kaukauna, Wis.
Filed Dec. 19, 1963, Ser. No. 331,861
4 Claims. (Cl. 214—17)

This invention relates to improvements in silo unloaders, and more particularly to a silo unloader having an improved collector arm drive assembly.

This invention is intended to be an improvement on the automatic silo unloaders disclosed in my issued Patents No. 3,063,581, dated November 13, 1962, and No. 3,071,263, dated January 1, 1963. As will be seen in said issued patents, said machines include a power-driven collector arm which projects radially from a central drive shaft, and which revolves therearound while gathering the surface silage and delivering it to the center of the silo. As the silage reaches the center of the silo it is dropped onto a lateral conveyor beneath said collector arm which carries it radially outwardly and discharges said silage through the silo wall openings. The object of the present invention is to provide a silo unloader which is generally similar to said prior machines, but wherein the rotary collector arm is mounted below the lateral discharge conveyor, there being an auger-type elevator on the central drive shaft to lift the silage from said collector arm to the discharge conveyor, and wherein said collector arm is drivably connected to said center shaft in a novel manner whereby the drive assembly does not interfere with the transfer of silage from said rotary collector to the central elevator.

A further object of the invention is to provide a silo unloader having a novel drive connection between the rotary collector arm and the central drive shaft which eliminates the necessity for an expensive beveled gear and gear housing assembly, such as those employed in my prior machines.

Further objects of the present invention are to provide an improved silo unloader which is inexpensive to operate, which is dependable in operation, and which is otherwise particularly well adapted for its intended purposes.

With the above and other objects in view, which other objects and advantages will become apparent hereinafter, the invention consists of the improved silo unloader and all of its parts and combinations as set forth in the following specification and claims, and all equivalents thereof.

Figure 2:
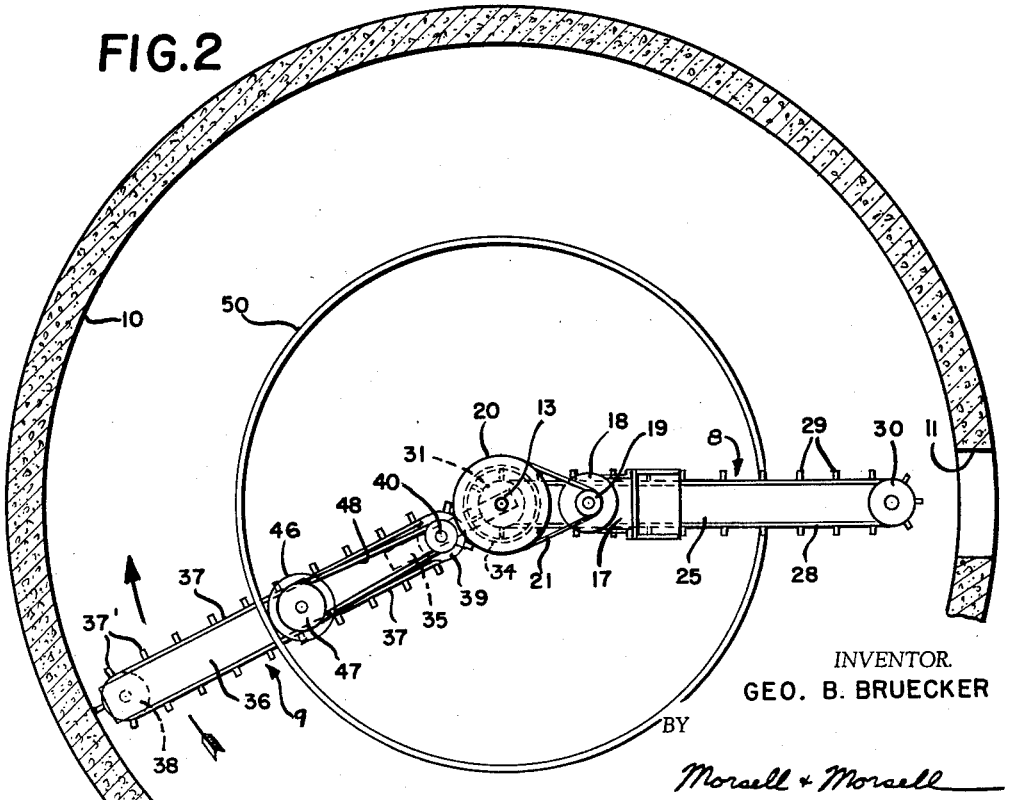

In the accompanying drawing, illustrating a preferred embodiment of the invention, and wherein like reference numerals designate the same parts in both of the views:

FIG. 1 is a fragmentary vertical sectional view of a silo, showing, in side elevation, the improved silage unloader therein; and FIG. 2 is a top plan view of the improved u,nloader, showing the rotary collector arm in a different position than that illustrated in FIG. 1.

Referring now more particularly to the drawing, the automatic silo unloader comprising the present invention is designed to be mounted in a conventional cylindrical silo 10 having a plurality of aligned and vertically-spaced doorway openings 11 which extend the entire height of the silo, and through which silage may be discharged. Said unloader includes a rotatable, vertical shaft 13 which is centered in the silo, and which is provided with a top member 14 (FIG. 1) to which there is attached a supporting cable 15. Said cable is extended over a pulley 16 at the top of the silo, and is preferably secured to a power winch (not shown) on the silo exterior so that the entire machine can be readily raised and lowered in the silo.

Projecting radially from said central shaft 13 is a platform 17, said shaft being journaled for rotation therein, and mounted on said platform is a motor 18, or other prime mover, having a sheave or sprocket 19 thereon. Mounted fast on said central shaft 13 is an aligned sheave or sprocket 20, and trained about said sheaves 19 and 20 is an endless flexible member 21, such as a belt or chain, providing a drive connection between said rotatable central shaft and the motor 18. As is shown in FIG. 1, said motor supporting platform 17 has its outer end supported by a strut 22 extending from the top of the center shaft 13.

Projecting radially from the central shaft 13 below the motor platform 17 is the lateral discharge conveyor 8 employed in the present invention. Said conveyor assembly includes a stationary trough 25 which extends radially outwardly from the center shaft to a point adjacent the silo wall, in alignment with the silo doorway openings 11, and the outer end of said trough is supported by a strut 26 which is attached to the upper portion of said central shaft. In addition, a cable 27 may be suspended from the roof of the silo to provide increased support for said trough.

Mounted within said conveyor trough 25 is an endless chain 28 which is trained about a sprocket 30 at the trough outer end, and the inner end of said chain is trained about a sprocket 31 fast on the central shaft 13, thus providing a drive connection between said endless chain and said drive shaft. Said chain is provided with a plurality of spaced fingers 29, and as said chain turns during the opertion of the machine, as will be hereinafter described, silage deposited on the inner end of the trough 25 is engaged by said fingers 29 and moved radially outwardly thereby and discharged through the silo wall openings 11. The design and function of said lateral conveyor is not new in the present unloader, similar discharge conveyors having been used previously in the art, but it his been described herein to promote a clear understanding of the operation of the complete machine.

The rotary collector arm 9 in the present assembly is spaced below the discharge conveyor 8, in contrast to the arrangement of said members in my prior machines, and integral on the central shaft 13 between said collector arm and conveyor members is an auger-type elevator 33 (FIG. 1). Said auger has a cylindrical surrounding housing 34, and in the operation of the machine said elevator device functions to lift the silage which is continuously delivered thereto by the revolving collector arm 9, onto the conveyor trough 25 thereabove.

In accordance with the present invention, said collector arm 9 includes an arm-like bearing support member 35 which is mounted on and for free rotation about the lower portion of the central drive shaft 13, said bearing member projecting radially outwardly and then upwardly at an angle as illustrated in FIG. 1, and mounted on and extending longitudinally beyond said bearing member is a flat, elongated arm 36 which terminates at a point adjacent the silo wall. As will be noted in FIG. 1, projecting through and rotatably supported by said bearing member at a point spaced from the central drive shaft 13 is a vertical shaft 40 which is arranged parallel to said central shaft. Said shaft 40 is provided with a sprocket 41 on its lower, projecting end portion, and trained thereabout and about an aligned sprocket 43 on the central drive shaft is an endless chain 42. Thus there is provided a drive connection for communicating the rotatable movement of the central drive shaft 13 to said parallel shaft 40. Said shaft 40 will be hereinafter referred to as the driven shaft, and is a critical structural element of the present invention, as will be seen.

Mounted on said driven shaft 40 adjacent the underside of the arm member 36 is a sprocket 39, and trained thereabout, and about a sprocket 38 on the arm outer end, is a chain 37 having a plurality of spaced fingers 37' projecting therefrom. In the operation of the present unloader, said chain is caused to turn, through the power communicating means provided by the driven shaft 40 and sprocket 39, and as said chain moves the fingers 37' thereon engage the surface of the silage and continuously urge the same radially inwardly to the auger member 33. Mounted on the upper end of said vertical, driven shaft 40 is a sprocket 45, and rotatably supported on top of the arm member 36 intermediate its length is a horizontally-mounted rubber wheel 46 having a coaxial sprocket 47 thereon, there being a chain 48 trained about said sprockets 45 and 47 to provide drive means for said wheel 46.

As will be seen in the drawings, an enlarged horizontally-disposed ring 50 is suspended from the upper portion of the present machine in the plane of the aforementioned wheel 46, and the latter is adapted to frictionally engage against and ride on the inner surface of said ring when said wheel is rotatably driven, through the power communicating means hereinabove described. Thus, the entire collector arm 9 may be caused to revolve around the central shaft 13 as the collector arm chain 37 simultaneously urges the silage engaged thereby radially inwardly to the elevator 33. Said drive ring 50 is supported by a plurality of struts 51 (FIG. 1) which extend downwardly and outwardly from the central shaft top member 14.

Mounted on the extreme lower end of the central drive shaft 13 in the illustrated form of the invention is a spinner blade 52 (FIG. 1), and mounted on the lower end of the adjacent, driven shaft 40 is a second spinner blade 53. During the operation of the machine said blade rotate to cut and clear the silage from beneath the drive mechanism to prevent clogging of the same, and to promote the smooth descent of the unloader. While said spinner blades have been found to facilitate the operation of the machine, as described, the same objective can be obtained with almost as satisfactory results by equipping the bottom drive chain 42 with projecting lugs or teeth which function to clear away the silage from beneath the machine as said chain turns, and said spinner blades 52 and 53 can be eliminated from the structure if desired.

In the operation of the present silo unloader, the machine is initially positioned with the rotary collector arm 9 engaging the upper surface of the silage, and the motor 18 is actuated to drive the rotatable central shaft 13. Through the connection of the drive wheel 46 to said central shaft (through the driven rod 40 and chain 48), and the frictional engagement of said wheel with the stationary ring 50, said collector arm 9 is caused to revolve around said central shaft, and to travel around the silo. Simultaneously, as hereinabove described, the endless chain 37 on said rotary arm is turned, through the drive communication provided by said vertical, driven shaft 40, thereby continuously moving the silage engaged by said revolving arm radially inwardly to the central auger 33. Said auger then elevates the silage and deposits the same on the discharge trough 25 thereabove, and the lateral conveyor 8 moves said silage radially outwardly and discharges it through the doorway openings 11 in the silo wall.

One of the principal features of the present structure, as mentioned, is the fact that the novel drive mechanism for the revolving collector arm 9 is so designed that it does not interfere with the transfer of silage from said collector to the elevator 33. In conventional unloaders of the general type herein concerned, the collector arm is drivably connected directly to the central drive shaft by means of a beveled gear assembly such as those disclosed in my prior Patents Nos. 3,071,263 and 3,063,581. Unfortunately, however, such a drive connection would not be satisfactory in the present machine, wherein the rotary collector arm is mounted below the lateral conveyor, because the gear box would necessarily be positioned between the collector arm and the auger member 33, and would interfere with the passage of silage therebetween. With the novel, offset drive assembly characterizing the present invention, on the other hand, wherein the drive communication between the center shaft 13 and the collector arm 9 is provided by a parallel driven shaft 40 which is spaced outwardly from said central drive shaft, there is nothing between said central shaft and the inner end of the collector arm, thus permitting the latter to be positioned immediately adjacent said auger, as shown. The result is that silage gathered by said revolving arm 9 is delivered directly against the elevator 33, and there is no possibility of said silage not being engaged and acted upon by said elevator.

From the foregoing, it will be seen that the novel offset drive mechanism described herein has been especially designed for the present silo unloader, in lieu of the conventional gear-type drive connection, and that the present assembly has certain important functional advantages in a machine of the type herein concerned. Moreover, said improved drive assembly is less expensive in design and construction, and reduces the manufacturing cost of the machine.

It is to be understood that the improved silo unloader comprising the present invention is not to be limited or confined to a machine including all of the exact structural details illustrated and herein above described. Obvious modifications will undoubtedly suggest themselves to persons skilled in the art, and all of such changes or modifications are contemplated which do not depart from the spirit of the invention, and which come within the scope of the following claims.

What I claim is:

1. In a silo unloader having a frame including a vertical, central drive shaft, having a rotatable collector arm operatively associated with said drive shaft, and having a lateral conveyor extending radially outwardly from said central drive shaft, the improved collector arm and drive assembly, comprising: an elongated arm member supported on and for free rotation about said central drive shaft below said lateral conveyor; a vertical, driven shaft rotatably supported by and projecting through said arm member at a point spaced from said central drive shaft; connecting means on and between said central shaft and said spaced, driven shaft for communicating the rotatable movement of said central shaft to said parallel, driven shaft; silage-gathering means on said elongated arm operatively connected to said driven shaft and adapted to carry silage engaged thereby radially inwardly and to deposit the same directly against said central shaft, the spaced mounting of said driven shaft relative to the central shaft permitting the unobstructed passage of silage between said silage-gathering means and said central shaft; means on said elongated arm member operatively associated with said driven shaft for causing said arm member to revolve around said central shaft; and elevator means on said central drive shaft between said lateral conveyor and rotary collector members, said elevator means being adapted to receive silage from said silage-gathering means and to lift the same onto the lateral conveyor thereabove.

2. In a silo unloader having a frame including a vertical, central drive shaft, having a rotatable collector arm operatively associated with said drive shaft, and having a lateral conveyor extending radially outwardly from said central drive shaft, the improved collector arm and drive assembly, comprising: an elongated arm member supported on and for free rotation about said central drive shaft below said lateral conveyor, said arm member extending radially outwardly to a point adjacent the silo wall, and said arm member having a sprocket on its outer end; a vertical, driven shaft rotatably supported by and projecting through said arm member at a point spaced from said central drive shaft, said driven shaft having a sprocket on its lower end portion, and having an upper sprocket adjacent said elongated arm member; a sprocket on the lower end portion of said central drive shaft; an endless chain trained about said central drive shaft sprocket and about the lower sprocket on said driven shaft, said chain and sprocket members providing means for communicating the rotatable movement of said central shaft to said parallel, driven shaft; an endless, silage-gathering chain trained about said driven shaft upper sprocket and about the sprocket on the outer end of said arm element, said chain being adapted to carry silage engaged thereby radially inwardly and to deposit the same directly against said central drive shaft, the spaced mounting of said driven shaft relative to the central shaft permitting the unobstructed passage of silage between said silage-gathering chain and said central shaft; means on said elongated arm member operatively associated with said driven shaft for causing said arm member to revolve around said central shaft; and elevator means on said central drive shaft between said lateral conveyor and rotary collector members, said elevator means being adapted to receive silage from said silage-gathering chain and to lift the same onto the lateral conveyor thereabove.

3. In a silo unloader having a frame including a vertical, central drive shaft, having a rotatable collector arm operatively associated with said drive shaft, and having a lateral conveyor extending radially outwardly from said central drive shaft, the improved collector arm and drive assembly, comprising: an arm-like bearing support member mounted on and for free rotation about said central drive shaft below said lateral conveyor; an elongated arm element on said bearing member extending from a point immediately adjacent said central shaft radially outwardly to a point adjacent the silo wall, said arm element having a sprocket on its outer end; a vertical, driven shaft rotatably supported by and projecting through said bearing support and arm members at a point spaced from said central drive shaft, said driven shaft having a sprocket on its lower end portion, having an intermediate sprocket thereon adjacent said elongated arm element, and said driven shaft having a sprocket on its upper end; a sprocket on the lower end portion of said central drive shaft; an endless chain trained about said central drive shaft sprocket and about the lower sprocket on said driven shaft, said chain and sprocket members providing means for communicating the rotatable movement of said central shaft to said parallel, driven shaft; an endless, silage-gathering chain trained about said driven shaft intermediate sprocket and about the sprocket on the outer end of said arm element, said chain being adapted to carry silage engaged thereby radially inwardly and to deposit the same directly against said central shaft, the spaced mounting of said driven shaft relative to the central shaft permitting the unobstructed passage of silage between said silage-gathering chain and said central shaft; a horizontal wheel rotatably mounted on said arm element intermediate its length, said wheel having a coaxial sprocket thereon; an endless chain trained about said wheel sprocket and about said driven shaft upper sprocket to provide means for communicating the rotatable movement of said driven shaft to said wheel; an enlarged drive ring supported by said frame in a position whereby said wheel frictionally engages the ring inner surface, and whereby said wheel can be driven therearound to cause the collector arm to revolve around the central shaft; and elevator means on said central drive shaft between said lateral conveyor and rotary collector members, said elevator means being adapted to receive silage from said silage-gathering chain and to lift the same onto the lateral conveyor thereabove.

4. In a silo unloader having a frame including a vertical drive shaft adapted to be centered in a silo, having a rotatable collector arm operatively associated with said drive shaft, and having a lateral conveyor extending radially outwardly from said central drive shaft in a fixed position, the improved collector arm and drive assembly, comprising: an arm-like bearing support member mounted on and for free rotation about said central drive shaft below said lateral conveyor; an elongated arm element on and extending longitudinally beyond said bearing member to a point adjacent the silo wall, the inner end of said arm element terminating adjacent the central drive shaft, said arm element having a sprocket on its outer end; a vertical, driven shaft rotatably supported by and projecting through said bearing support and arm members at a point spaced from said central drive shaft, said driven shaft having a sprocket on its lower end portion, having an intermediate sprocket thereon adjacent said elongated arm element, and said driven shaft having a sprocket on its upper end; a sprocket on the lower end portion of said central drive shaft; an endless chain trained about said central drive shaft sprocket and about the lower sprocket on said driven shaft, said chain and sprocket members providing means for communicating the rotatable movement of said central shaft to said parallel, driven shaft; an endless, silage-gathering chain trained about said driven shaft intermediate sprocket and about the sprocket on the outer end of said arm element, said chain being adapted to carry silage engaged thereby radially inwardly and to deposit the same directly against said central shaft, the spaced mounting of said driven shaft relative to the central shaft permitting the unobstructed passage of silage between said silage-gathering chain and said central shaft; a horizontal wheel rotatably mounted on said arm element intermediate its length, said wheel having a coaxial sprocket thereon; an endless chain trained about said wheel sprocket and about said driven shaft upper sprocket to provide means for communicating the rotatable movement of said driven shaft to said wheel; an enlarged drive ring supported by said frame in a position whereby said wheel frictionally engages the ring inner surface, and whereby said wheel can be driven therearound to cause the collector arm to revolve around the central shaft; and an auger-type elevator formed on said central drive shaft between said lateral conveyor and rotary collector members, said elevator being adapted to receive silage from said silage-gathering chain and to lift the same onto the lateral conveyor thereabove.

References Cited in the file of this patent

UNITED STATES PATENTS

| | | |
|---|---|---|
| 2,678,241 | Miller | May 11, 1954 |
| 3,063,581 | Bruecker | Nov. 13, 1962 |
| 3,071,263 | Bruecker | Jan. 1, 1963 |